United States Patent
Tousain et al.

(10) Patent No.: US 9,485,828 B2
(45) Date of Patent: Nov. 1, 2016

(54) LED LAMP COMPRISING A SAFETY MODULE FOR SAFE OPERATION ON VARIOUS BALLASTS

(71) Applicant: KONINKLIJKE PHILIPS N.V., Eindhoven (NL)

(72) Inventors: Robertus Leonardus Tousain, Shanghai (CN); Tian Xiang Wen, Shanghai (CN); Haimin Tao, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/895,183

(22) PCT Filed: Jun. 4, 2014

(86) PCT No.: PCT/EP2014/061563
§ 371 (c)(1),
(2) Date: Dec. 1, 2015

(87) PCT Pub. No.: WO2014/195350
PCT Pub. Date: Dec. 11, 2014

(65) Prior Publication Data
US 2016/0120002 A1 Apr. 28, 2016

(30) Foreign Application Priority Data
Jun. 4, 2013 (EP) .................... 13170493

(51) Int. Cl.
H05B 33/08 (2006.01)
H02H 3/08 (2006.01)

(52) U.S. Cl.
CPC .......... H05B 33/0887 (2013.01); H02H 3/08 (2013.01); H05B 33/0806 (2013.01); H05B 33/0809 (2013.01); H05B 33/0821 (2013.01); Y02B 20/341 (2013.01)

(58) Field of Classification Search
CPC .......... H05B 33/0803; H05B 33/0815; H05B 33/0809; H05B 33/083; F21Y 2101/02; F21Y 2103/003; F21Y 2113/00; F21K 9/30
USPC .................. 315/58, 185 R, 200 R, 291, 312; 362/221, 227, 249.02
See application file for complete search history.

(56) References Cited

U.S. PATENT DOCUMENTS 7,507,001 B2 * 3/2009 Kit ............................ F21K 9/17
315/51
8,858,019 B2 * 10/2014 Novak .................... F21S 8/036
362/221

(Continued)

FOREIGN PATENT DOCUMENTS

EP 2503235 A1 9/2012
GB 2489513 A 10/2012

(Continued)

*Primary Examiner* — Haissa Philogene

(57) ABSTRACT

The current invention relates to a LED lamp (10) comprising at least one LED light source (103), at least one driver (101) for powering the LED light source (103), at least one input rectifier with a plurality of diodes for converting an AC current from mains into a DC current, providing electrical power to the driver (101), the LED lamp (10) further comprising a safety module comprising one first and one second modules (F1, F2) for protection against overcurrent and overheating of the EM ballast, the first module (F1) being put in series with the driver (101) and designed to interrupt current in case the driver fails when the LED lamp (10) is directly connected to the mains, and the second module (F2) being designed to interrupt current when at least one of the diodes of the input rectifier fails when the lamp is connected to the mains via an EM ballast.

11 Claims, 6 Drawing Sheets

(56) References Cited

U.S. PATENT DOCUMENTS

| | | | |
|---|---|---|---|
| 9,204,505 B2* | 12/2015 | Stamm | H05B 33/0815 |
| 9,338,853 B2* | 5/2016 | Guang | F21V 23/002 |
| 9,357,600 B2* | 5/2016 | Tao | H05B 33/0803 |
| 2004/0095078 A1 | 5/2004 | Leong | |
| 2012/0043892 A1 | 2/2012 | Visser et al. | |
| 2012/0119654 A1 | 5/2012 | Huh | |
| 2012/0194077 A1 | 8/2012 | Wei et al. | |
| 2012/0286696 A1 | 11/2012 | Ghanem | |
| 2013/0320869 A1* | 12/2013 | Jans | H05B 33/0803 315/186 |

FOREIGN PATENT DOCUMENTS

| | | |
|---|---|---|
| WO | 2010069983 A1 | 6/2010 |
| WO | 2012110973 A1 | 8/2012 |

* cited by examiner

LED LAMP COMPRISING A SAFETY MODULE FOR SAFE OPERATION ON VARIOUS BALLASTS

CROSS-REFERENCE TO PRIOR APPLICATIONS

This application is the U.S. National Phase application under 35 U.S.C. §371 of International Application No. PCT/EP2014/061563, filed on Jun. 4, 2014, which claims the benefit of European Patent Application No. 13170493.4, filed on Jun. 4, 2013. These applications are hereby incorporated by reference herein.

TECHNICAL FIELD

The present invention is directed to a light emitting diode (LED) lamp comprising a safety module for safe operation on various ballasts. More particularly, various inventive apparatus disclosed herein relate to a LED lamp that can be compatibly retrofit into various lighting fixtures having ballasts, and notably electromagnetic (EM) ballasts.

BACKGROUND

There are many commercial, industrial, and retail environments, such as factories, stores, warehouses, and office buildings that are equipped with a large number of lighting fixtures with installed fluorescent tubes, such as tubes of the types designated as T8 or T12, and accompanying electromagnetic (EM) ballasts.

LED-based luminaires tend to be advantageous replacement solutions for fluorescent tubes. LED-based tubes are commonly designated as "LED tubes" or by the acronym "TLEDs". There are various existing LED tubes nowadays, most of them being designed to be supplied by a mains input, such LED tubes being commonly designated as "mains compatible".

One of the main challenges in designing LED tubes is to make the products fail-safe on various existing ballasts. Mains compatible LED tubes available nowadays are not fully safe on EM ballasts. Such LED tubes are typically comprising an input rectifier comprising a diode bridge. However if it occurs that any of the diodes of the diode bridge fails, then a direct current will flow through the EM ballast, and the EM ballast will be at risk of overheating if the lamp input fuse does not blow under such a fault condition.

SUMMARY

One aim of the present invention is to solve the above-mentioned safety problems, by providing a technical solution to improve safety, notably of LED drivers or LED tubes used on EM ballasts.

According to the present invention, it is proposed that a LED lamp comprising a driver further comprises two modules for protection against overcurrent, a first module being designed to interrupt current when the LED driver is directly connected to the mains, and a second module is designed to interrupt current when the input rectifier included in the driver fails.

For that purpose, the current invention proposes a LED lamp comprising:
  at least one LED light source,
  at least one driver for powering the LED light source with required drive current,
  at least one input rectifier with a plurality of diodes for converting an AC current from mains into a DC current, providing electrical power to the driver,
  the LED lamp being further comprising a safety module comprising one first and one second modules for protection against overcurrent, the first module being put in series with the driver and designed to interrupt current in case the driver fails when the LED lamp is directly connected to the mains, and the second module being designed to interrupt current when at least one of the diodes of the input rectifier fails when the LED lamp is connected to the mains via an EM ballast.

In another embodiment of the invention, each of said protection modules can comprise a fuse.

In another embodiment of the invention, each of said protection modules can comprise a current breaker.

In another embodiment of the invention, each of said protection modules can comprise a rewirable fuse.

In an embodiment of the invention, rated current of the second module for protection against overcurrent can be lower than rated current of the first module for protection against overcurrent.

In an embodiment of the invention, rated current of the second module for protection against overcurrent can be at least 20% lower than rated current of the first module for protection against overcurrent.

In another embodiment of the invention, the rated current of the second module for protection against overcurrent can be comprised between 200 mA to 500 mA.

In an embodiment of the invention, the rated current of the second module for protection against overcurrent can be comprised between 250 mA to 300 mA.

In an exemplary embodiment of the invention, the LED lamp can be a LED tube comprising an end cap, the second module for protection against overcurrent being located in the end cap.

Another aspect of the current invention is a safety module for a LED lamp comprising a driver and at least one input rectifier with a plurality of diodes for converting an AC current from mains into a DC current, providing electrical power to the driver, said safety module comprising one first and one second modules for protection against overcurrent and overheating of the EM ballast, wherein the first module is designed to be put in series with the driver and interrupt current in case the driver fails when the LED lamp is directly connected to the mains, and the second module is designed to interrupt current when at least one of the diodes of the input rectifier fails when the lamp is connected to the mains via an EM ballast.

Another aspect of the current invention is a method for protecting a LED lamp comprising a driver and at least one input rectifier with a plurality of diodes for converting an AC current from mains into a DC current, the method comprising at least providing one first and one second modules for protection against overcurrent and overheating of the EM ballast, wherein the first module is designed to be put in series with the driver and interrupt current in case the driver fails when the LED lamp is directly connected to the mains, and the second module is designed to interrupt current when at least one of the diodes of the input rectifier fails when the lamp is connected to the mains via an EM ballast.

BRIEF DESCRIPTION OF THE DRAWINGS

These and other characteristics and advantages of the invention will be made clearer in view of the detailed description given below of a preferred embodiment, provided by way of an illustrative and non-limiting example only, as well as the accompanying drawings which represent.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Figure 1:
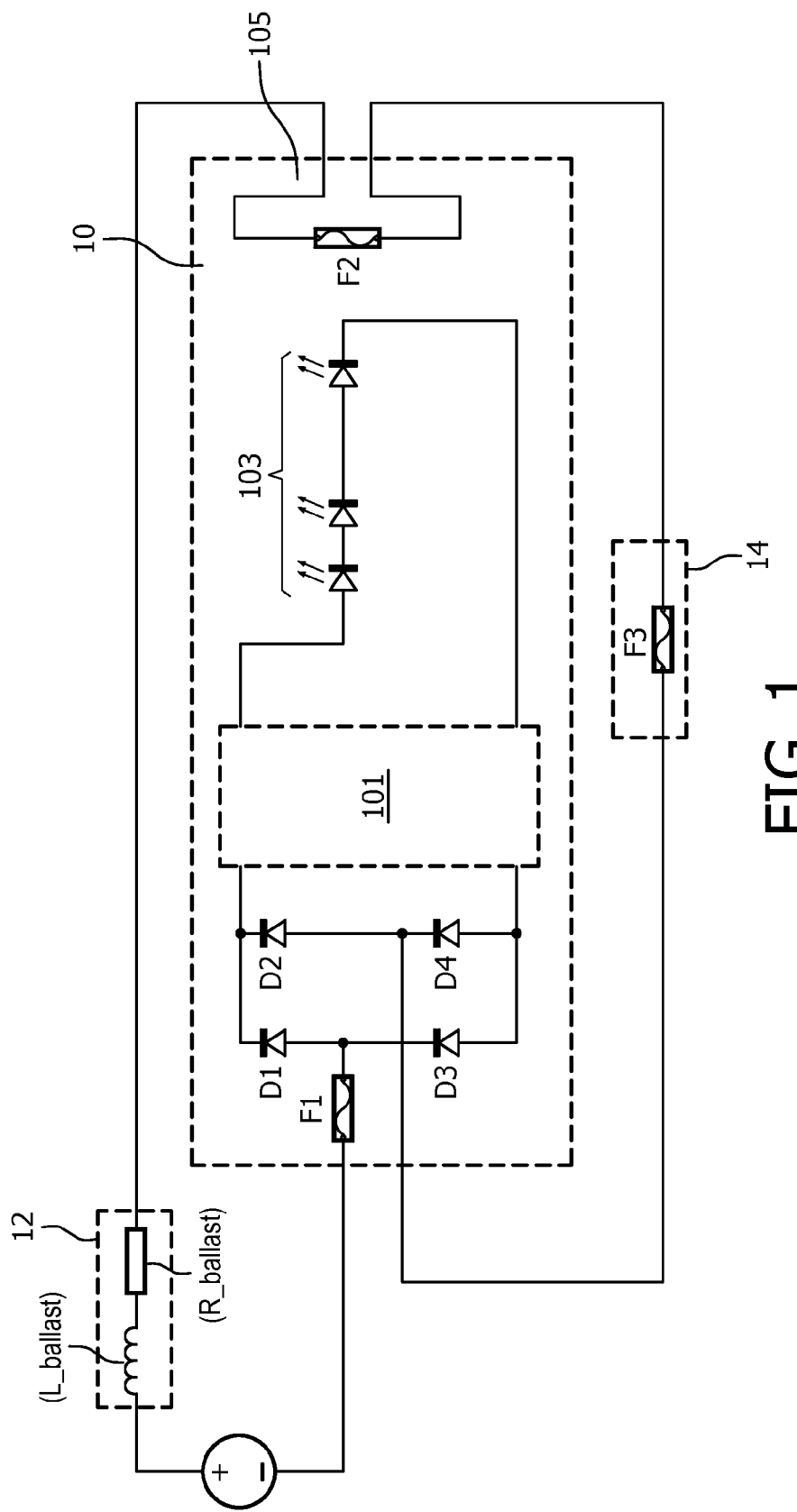
FIG. 1, a schematic drawing illustrating a typical LED tube operated with an EM ballast.

FIG. 1 shows a schematic drawing illustrating a known solution for operating a LED tube in an EM fixture without bypassing the EM ballast.

As depicted in FIG. 1, a LED tube 10 can be operated with an EM ballast 12. The EM ballast 12 is for instance designed to be supplied by the mains, i.e. for example by an alternating 230-V voltage. The EM ballast 12 can be modeled as a ballast inductor L_ballast in series with a ballast resistor R_ballast.

The LED tube 10 can comprise a driver 101 powering one LED light source or a series of LED light sources 103 as in the illustrated exemplary embodiment. The LED tube 10 further comprises a rectifier, typically a full-wave rectifier comprising four diodes D1, D2, D3, D4 as in the illustrated exemplary embodiment. In other embodiments, the rectifier can be integrated in the driver 101. The LED tube 10 further comprises one first fuse F1, in series with the rectifier or driver 101, and connected to the alternating voltage. The LED tube 10 can further comprise an end cap 105, which comprises a second fuse F2.

A retrofit solution as depicted in FIG. 1 requires that the glow start of a fluorescent tube, with which the EM ballast and fixture were originally designed to operate, be replaced by a dummy starter 14. The dummy starter 14 typically comprises a third fuse F3.

Figure 2A:
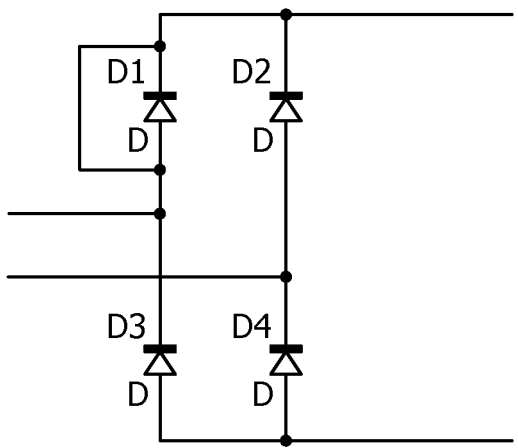
FIGS. 2A and 2B, schematic drawings illustrating a diode failure condition in a typical input rectifier of a LED driver.
Figure 2B:
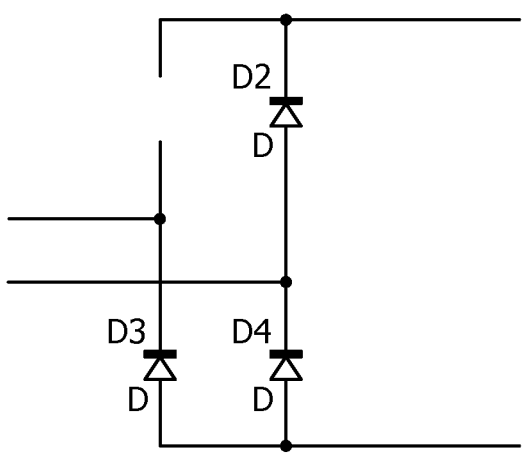

FIGS. 2A and 2B show schematic drawings illustrating a diode failure condition in a typical input rectifier of a LED driver.

A LED lamp typically comprises a LED driver aiming at powering at least one LED light source with a required current. The LED driver typically comprises an input rectifier and a switching mode power supply. The input rectifier is supplied with an alternating signal, for example coming from the mains. Under normal conditions, the LED lamp input is symmetrical.

However, the LED lamp input may become asymmetrical if it occurs that any of the diodes of the input rectifier fails. A diode failure can result in a short circuit or in an open circuit, these failure conditions being respectively designated as short failure and open failure. FIGS. 2A and 2B depict equivalent circuits of a full wave input rectifier comprising four diodes D1, D2, D3, D4, respectively in a case of a short failure of one diode and in a case of an open failure of one diode.

In reference to FIG. 2A, when a short failure of e.g. the first diode D1 of the full wave rectifier, then the circuit branch that comprises the first diode D1 actually behaves as a short circuit.

Now in reference to FIG. 2B, when an open failure of e.g. the first diode D1 of the full wave rectifier, then the circuit branch that comprises the first diode D1 actually behaves as an open circuit.

An EM ballast is originally designed to be supplied by an alternating signal, typically from the mains, and to operate a fluorescent lamp. In such a configuration for which no input rectifier is needed, no diode failure mode of the fluorescent tube can happen.

Figure 3:
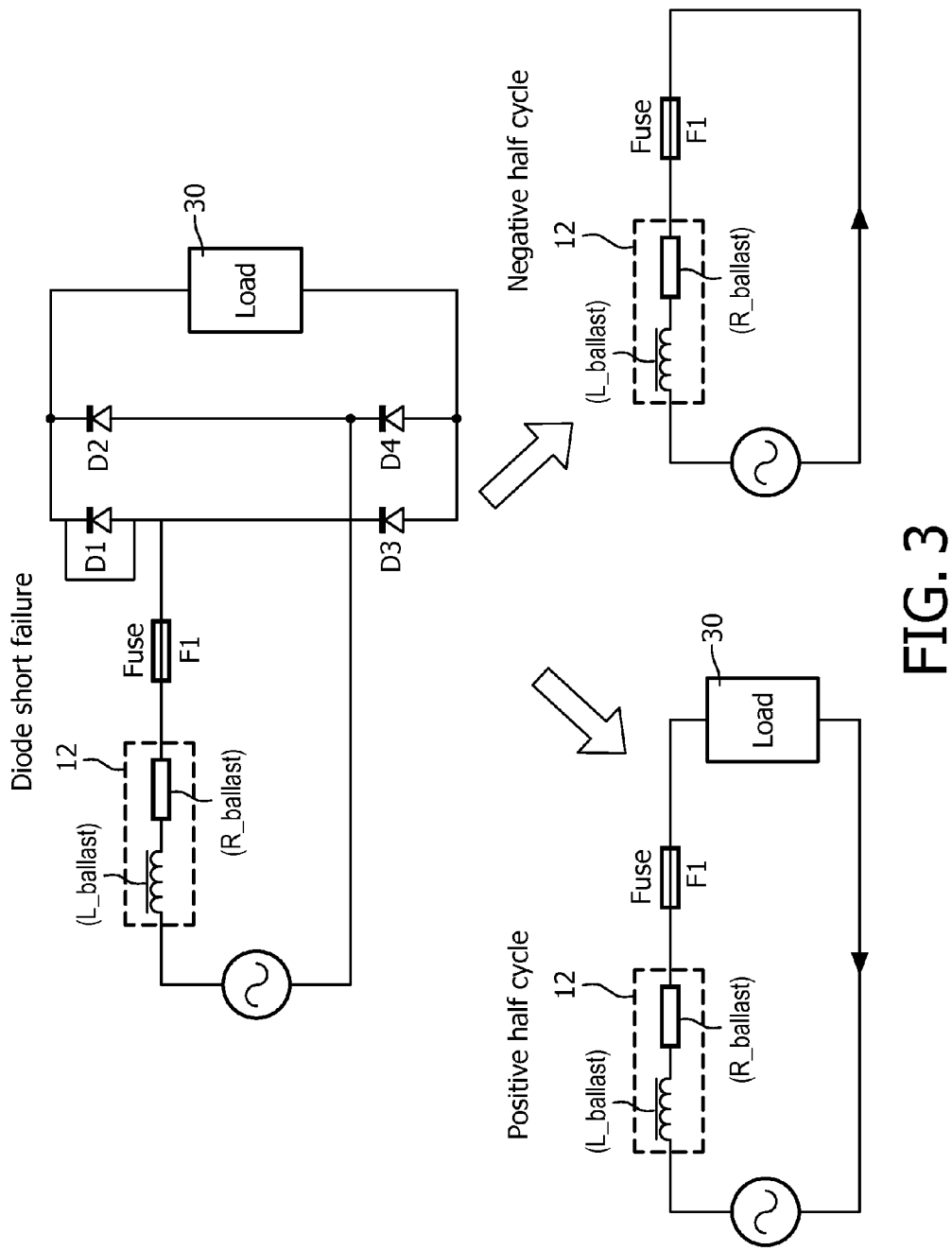
FIG. 3, a schematic drawing illustrating an equivalent model of a typical LED tube operating with an EM ballast, in case of diode short-failure.

FIG. 3 shows a schematic drawing illustrating an equivalent model of a typical LED tube operating with an EM ballast 12, in case of a diode short-failure, as described herein above in reference to FIG. 2A.

For the sake of simplicity, the EM ballast 12 is depicted as being connected to a first fuse F1 and an input rectifier in a configuration similar to that described above in reference to FIG. 1, the input rectifier being in a short fault condition, with its first diode D1 failing short. All the components that are connected downstream the rectifier are depicted as a load 30.

The EM ballast can be modeled as a ballast inductor L_ballast in series with a ballast resistor R_ballast. The EM ballast typically operates at mains frequency, that is: typically at a frequency of the mains signal being between 50 and 60 Hz. Within such frequency range, the EM ballast impedance is dominated by the inductance of the ballast inductor L_ballast.

In such a fault configuration, during the positive half cycle of the supply signal, the equivalent model of the circuit described above is a circuit wherein the EM ballast 12, the first fuse F1 and the load 30 and the source of alternating voltage are put in series, the electrical current being flowing through these respective components in the same order as they are recited above.

During the negative half cycle of the supply signal, the equivalent model of the circuit described above is a circuit wherein the source of alternating voltage, the EM ballast 12 and the first fuse F1 are put in series, the electrical current being flowing through these respective components in the same order as they are recited above.

Figure 4:
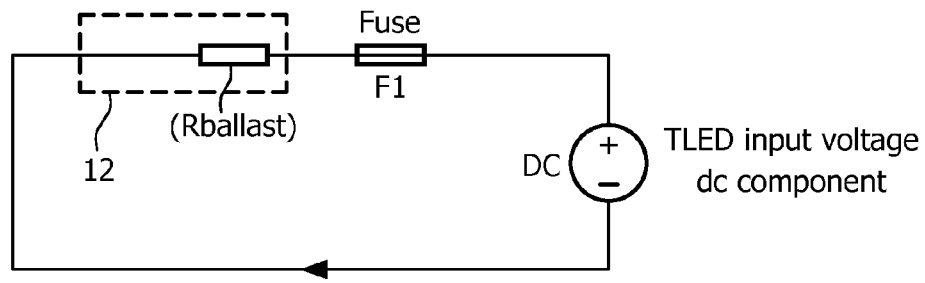
FIG. 4, a schematic drawing illustrating an equivalent DC model of a typical LED tube operating with an EM ballast, in case of diode short-failure.

FIG. 4 shows a schematic drawing illustrating an equivalent DC model of a typical LED tube operating with an EM ballast, in case of diode short-failure.

In any case, failure of any diode of the input rectifier leads to a symmetry of the signal, resulting in a DC current building up in the circuit, with an equivalent DC model as illustrated in FIG. 4. In DC operation, the EM ballast 12 is equivalent to the ballast resistance R_ballast. The amplitude of the DC current is then determined by the ballast resistance R_ballast.

Figure 5:
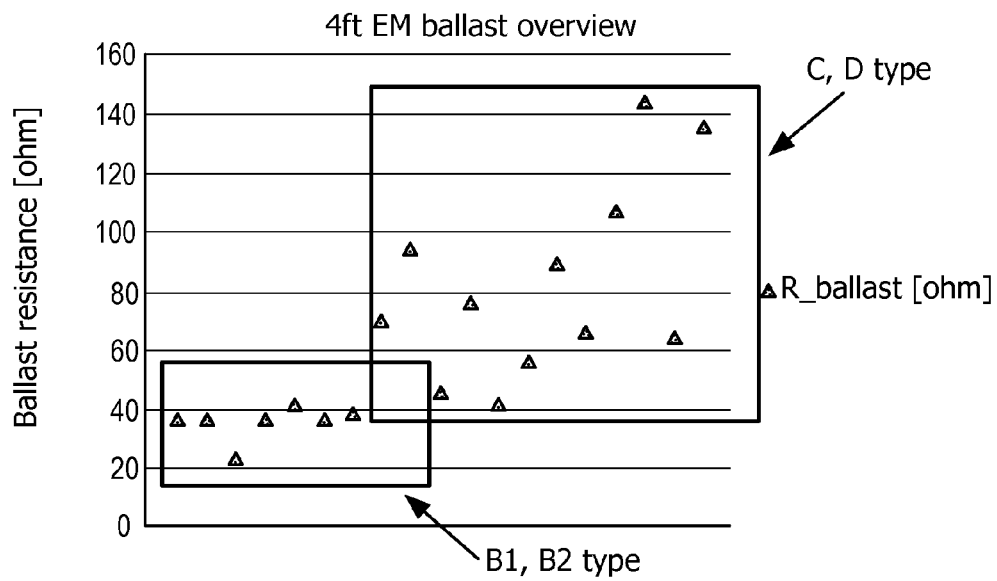
FIG. 5, a diagram illustrating the ballast resistances of various typical EM ballasts.

FIG. 5 shows a diagram illustrating the ballast resistances of various typical EM ballasts. In the diagram of FIG. 5, the abscissae arbitrarily correspond to different EM ballasts, while the ordinates represent the corresponding resistance values.

Depending on their respective energy efficiency classes, the EM ballasts have different internal resistances, typically ranging from 20 Ω to 150 Ω. The low resistance EM ballasts, i.e. typically EM ballasts with resistances up to 40 Ω, are commonly designated as belonging to so-called B1 or B2 type, and the high resistance EM ballasts are commonly designated as belonging to so-called C or D type.

Higher ballast resistances result in lower DC offsets; therefore corresponding ballasts are less likely to trigger the first fuse F1.

In summary, when one diode of the input rectifier fails, the lamp input current increases significantly higher than the normal operating current and thus causes saturation of the EM ballast, and consequently reduces its impedance. Such a fault condition leads to increased Root Mean Square (RMS) current through the EM ballast. In such a condition, the lamp fuse, i.e. the first fuse Fl in the illustrated exemplary embodiments, shall blow in order to interrupt the fault current.

However, if the first fuse Fl does not blow, due to the fact the fault current is limited by the resistance of the EM ballast, as described above, then the EM ballast will be overheated due to the fault current.

Figure 6:
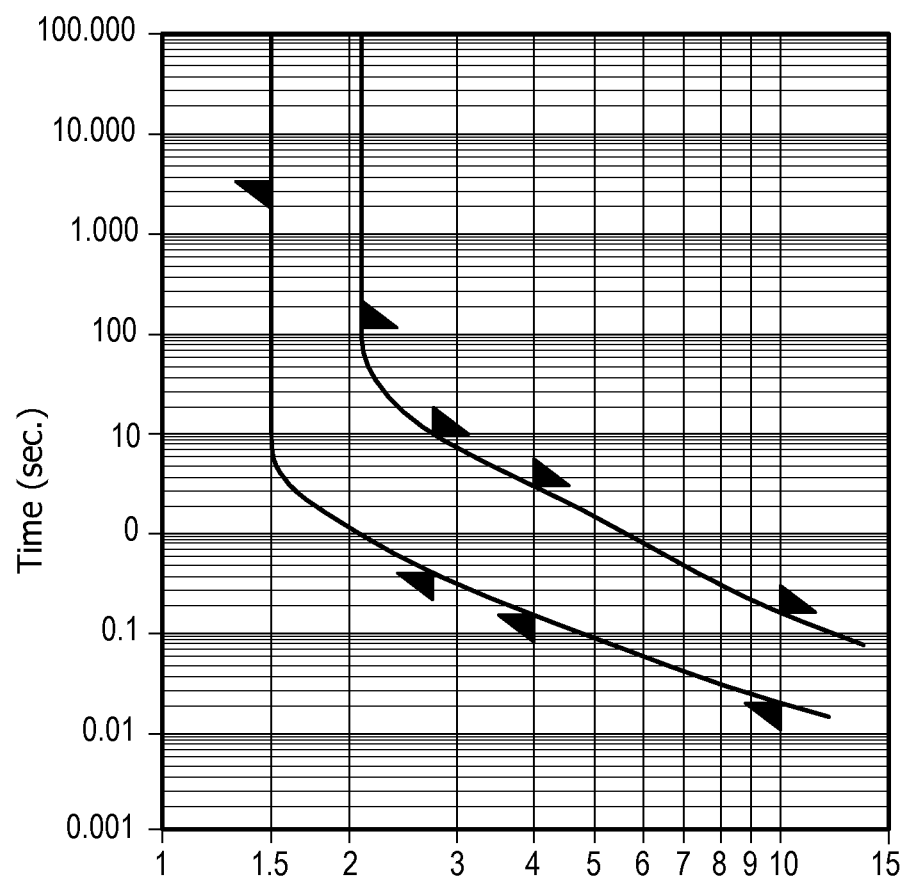
FIG. 6, a diagram illustrating the time-current characteristics of a typical fuse.

FIG. 6 shows the time-current characteristics of a typical fuse, through minimum and maximum limit curves presented in a diagram wherein abscissae represent the ratio between the fault current and the rated current Ifault/Irated, and ordinates represent time. As depicted by FIG. 6, for a typical fuse the fault current shall be at least twice higher than the rated current in order to trigger the fuse in an acceptable time.

The three main factors that are determining whether or not the first fuse F1 will blow are the resistance R_ballast of the EM ballast, the saturation current of the EM ballast, and the input voltage, e.g. the mains voltage: the higher the ballast resistance R_ballast, or the higher the saturation current of the EM ballast or the lower the input voltage, the less likely is the first fuse F1 to blow.

Figure 7:
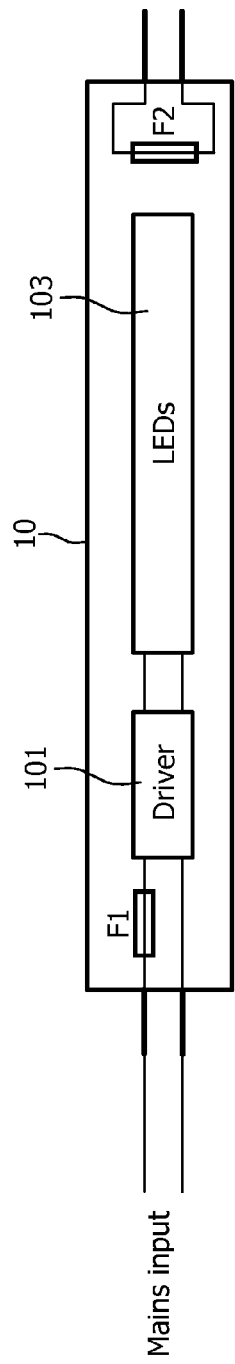
FIG. 7, a synoptic schematic illustrating a LED lamp with a safety module according to an exemplary embodiment of the invention in a first operational configuration.

FIG. 7 shows a synoptic schematic illustrating a LED lamp with a safety module according to an exemplary embodiment of the invention in a first operational configuration.

A LED lamp, for example a TLED 10 following an embodiment of the present invention, can comprise a driver 101 LED for powering at least one LED light source 103 with a required drive current.

The TLED 10 further comprises a safety module that comprises two modules for protection against overcurrent, for example respectively formed by a first fuse F1 and a second fuse F2.

More specifically, the first fuse F1 is put in series with the driver 101 and is designed to interrupt current in case the driver 101 fails when the TLED 10 is directly connected to the mains, or in any case the driver 101 input current becomes too high, for example due to failure of one of the driver 101 components or of the LEDs. As described hereinafter in reference to FIG. 8, the second fuse F2 is designed to interrupt current when at least one of the diodes that are comprised in the input rectifier, not depicted on FIG. 7, gets to fail.

The second fuse F2 can be located level with the end cap of the TLED 10. In the set-up configuration depicted in FIG. 7, the second fuse F2 has no particular role.

In the exemplary set-up configuration illustrated by FIG. 7, the TLED 10 is directly connected to the mains through one of its both ends, while the other end, that is: level with the end cap of the TLED 10, is an unused open end. In such a configuration, the TLED 10 is connected to a low impedance voltage source, that is: mains voltage in the illustrated exemplary embodiment, and the first fuse F1 will blow in fault conditions.

The rated current of the first fuse F1 can be chosen so as to guarantee that there is no early failure of the first fuse F1 due to mains surges or other transient overvoltage due to fast switching.

Figure 8:
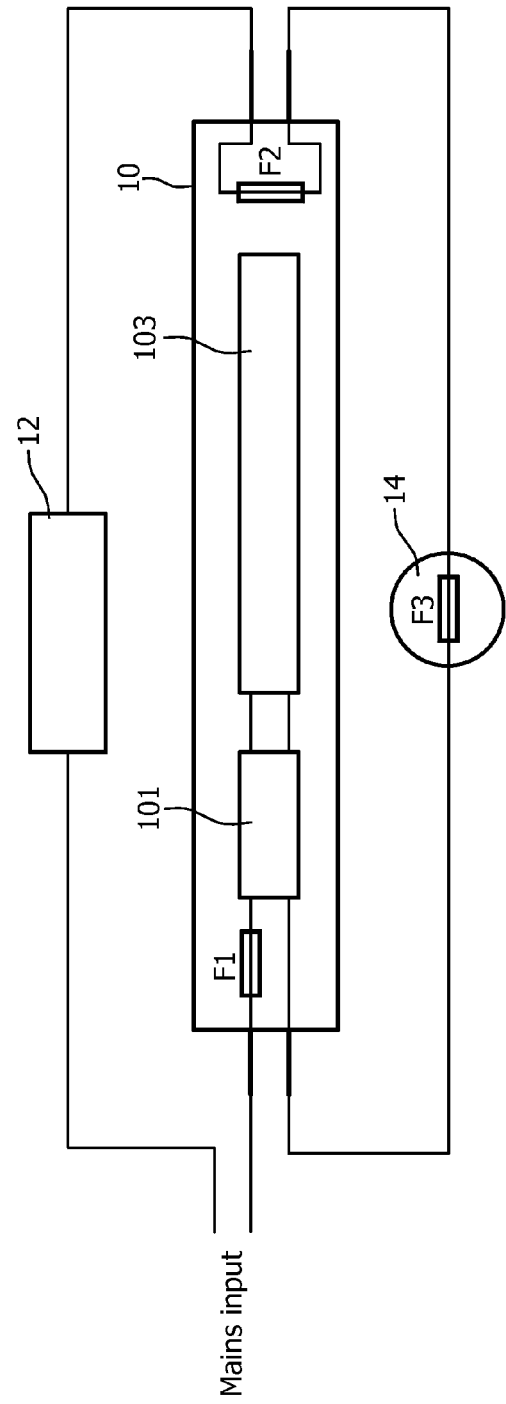
FIG. 8, a synoptic schematic illustrating a LED lamp with a safety module according to an exemplary embodiment of the invention, in a second operational configuration.

FIG. 8 shows a synoptic schematic illustrating a LED lamp with a safety module according to an exemplary embodiment of the invention, in a second operational configuration.

As in the exemplary embodiment illustrated by FIG. 8, the TLED 10 is set up in an alternative operational configuration, wherein the TLED 10 is retrofitted into an EM fixture, comprising an EM ballast 12 in a configuration similar to that described above in reference to FIG. 1. The EM ballast 12 can be connected to the mains input and to a first pin at one end of the TLED 10 that is level with the end cap. A second pin of the end-cap can be connected to the first pin through the second fuse F2, and to a pin of the TLED 10, through a dummy starter 14 comprising a third fuse F3.

The second fuse F2 is designed to interrupt current when at least one of the diodes that are comprised in the input rectifier, not depicted on FIG. 8, comes to fail. The second fuse F2 is designed so as to be easier to blow in a diode-fault condition, with a rated current that is chosen lower than that of the first fuse F1.

The rated current of the second fuse F2 can be at least 20% lower than rated current of the first fuse F1.

Providing a smaller rated current for the second fuse F2 that is located at the dummy end of the LED tube allows the LED tube to operate safely on an EM ballast, while still being reliably operable directly on mains voltage, without an EM ballast.

In a practical example of a 4-feet (120-centimeter) long TLED 10, the first fuse F1 can be rated at about 500 mA to 1 A, and the second fuse F2 at 200 mA to 500 mA, preferably 250 mA to 300 mA. As it has been tested by the applicant with various EM ballasts, a second fuse F2 rated at about 250 mA can blow in most cases, therefore mitigating the risk of overheating of the EM ballast.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For example, the described exemplary embodiments comprise fuses, but it shall be understood that any other type of means for protecting against overcurrent can be used in place of fuses, such means notably also comprise current breakers, rewirable fuses.

Though the exemplary embodiments apply to TLEDs, the invention can also apply to all kinds of LED retrofit lamps, such as retrofit solutions to linear fluorescent TL tubes, but also to circular tubes, and replacement solutions for compact fluorescent lamps, commonly referred to by the acronym "CFL".

All definitions, as defined and used herein, should be understood to control over dictionary definitions, definitions in documents incorporated by reference, and/or ordinary meanings of the defined terms.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed at limiting the scope.

The invention claimed is:

1. A LED lamp comprising:
    at least one Light Emitting Diode light source,
    at least one driver for powering the LED light source,
    at least one input rectifier with a plurality of diodes for converting an AC current from mains into a DC current, providing electrical power to the driver, and
    a safety module comprising one first and one second modules for protection against overcurrent,
    wherein the first module is in series with the driver and configured to interrupt current in case the driver fails when the LED lamp is directly connected to the mains, and the second module is configured to interrupt current when at least one of the diodes of the input rectifier fails when the LED lamp is connected to the mains via an EM ballast.

2. The LED lamp as claimed in claim 1, wherein said each of said protection modules comprises a fuse.

3. The LED lamp as claimed in claim 1, wherein said each of said protection modules comprises a current breaker.

4. lamp as claimed in claim 1, wherein said each of said protection modules comprises a rewirable fuse.

5. The LED lamp as claimed in claim 1, wherein rated current of the second module for protection against overcurrent is lower than the rated current of the first module for protection against overcurrent.

6. The LED lamp as claimed in claim 5, wherein rated current of the second module for protection against overcurrent is at least 20% lower than rated current of the first module for protection against overcurrent.

7. The LED lamp as claimed in claim 6, wherein the rated current of the second module for protection against overcurrent is comprised between 200 mA to 500 mA.

8. The LED lamp as claimed in claim 7, wherein the rated current of the second module for protection against overcurrent is comprised between 250 mA to 300 mA.

9. The LED lamp as claimed in claim 1, wherein the LED lamp is a LED tube comprising an end cap, the second module for protection against overcurrent being located in the end cap.

10. A Safety module for a LED lamp, the LED lamp comprising a driver and at least one input rectifier with a plurality of diodes for converting an AC current from mains into a DC current, providing electrical power to the driver, said safety module comprising:
    one first and one second modules for protection against overcurrent and overheating of an EM ballast,
    wherein the first module is in series with the driver and configured to interrupt current in case the driver fails when the LED lamp is directly connected to the mains, and the second module is configured to interrupt current when at least one of the diodes of the input rectifier fails when the LED lamp is connected to the mains via the EM ballast.

11. A Method for protecting a LED lamp comprising a driver and at least one input rectifier with a plurality of diodes for converting an AC current from mains into a DC current, the method comprising:
    providing one first and one second modules for protection against overcurrent and overheating of an EM ballast,
    placing the first module in series with the driver and configuring the first module to interrupt current in case the driver fails when the LED lamp is directly connected to the mains, and
    placing the second module is configured to interrupt current when at least one of the diodes of the input rectifier fails when the lamp is connected to the mains via the EM ballast.

* * * * *